April 24, 1951   J. C. DUFFENDACK, JR., ET AL   2,550,337
ENGINE COWLING
Filed Feb. 7, 1945   3 Sheets-Sheet 1
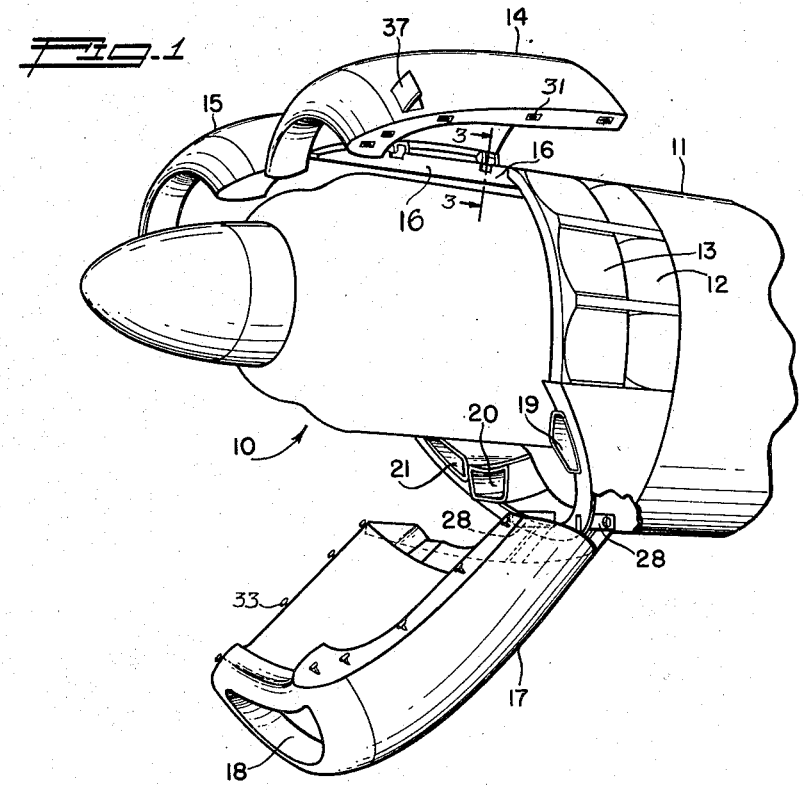
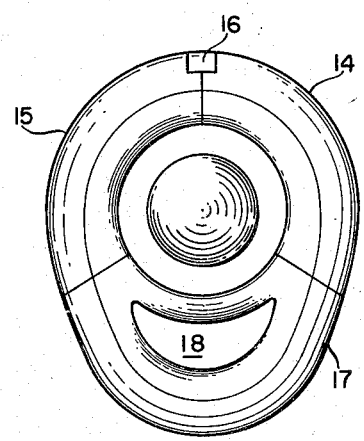
INVENTORS
JOHN C. DUFFENDACK JR.
WILLARD W. TJOSSEM
BY George C. Sullivan
Agent

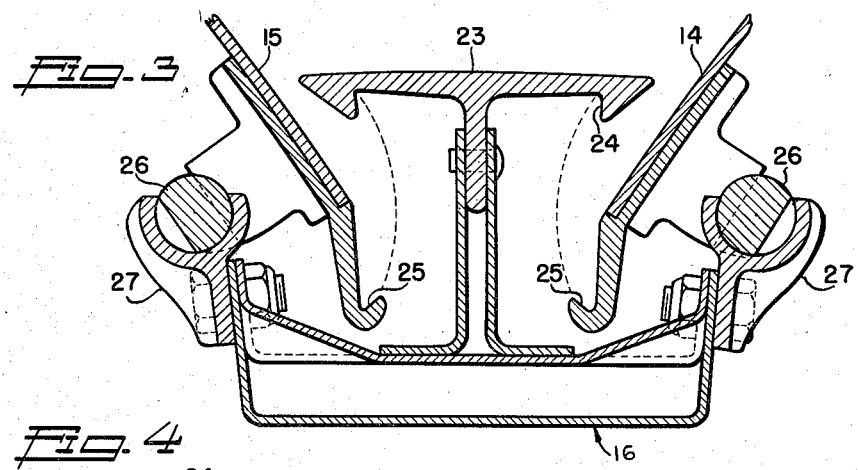
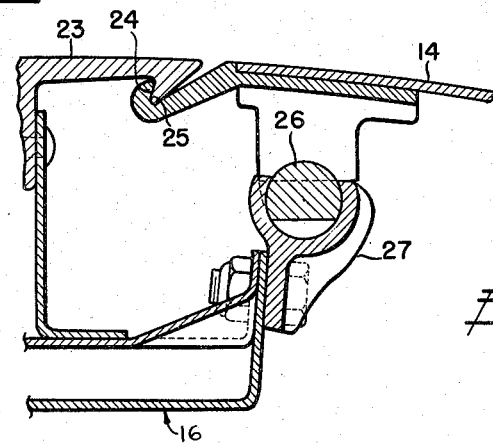
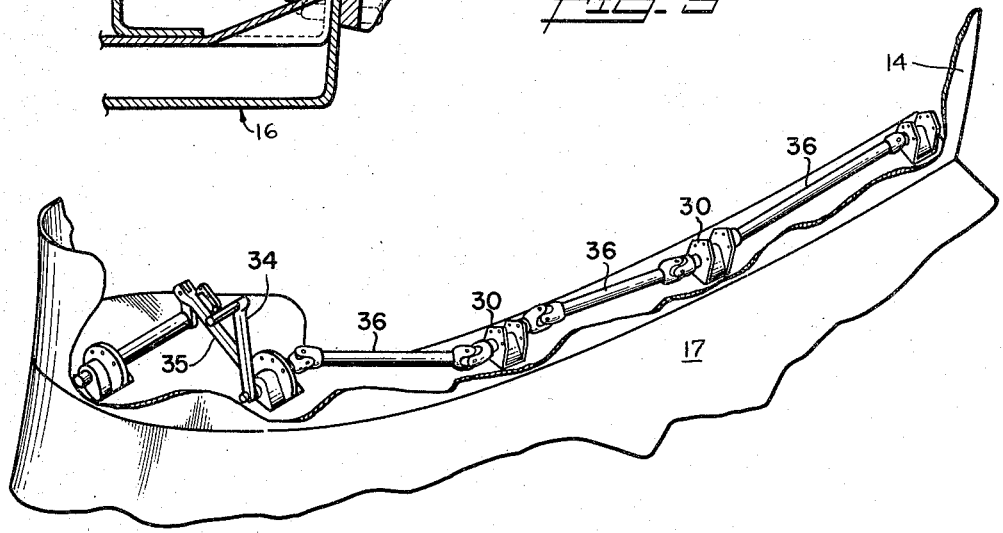

April 24, 1951    J. C. DUFFENDACK, JR., ET AL    2,550,337
ENGINE COWLING
Filed Feb. 7, 1945             3 Sheets-Sheet 3
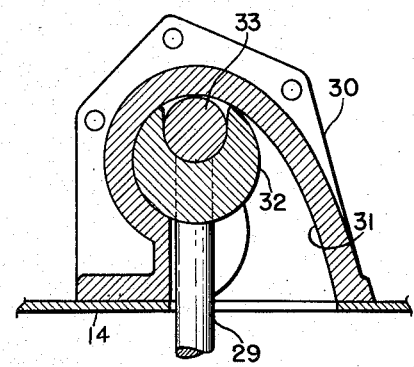
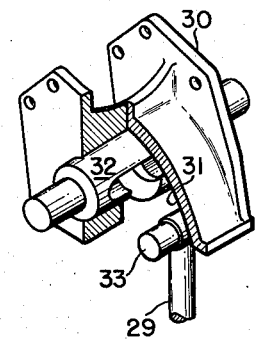
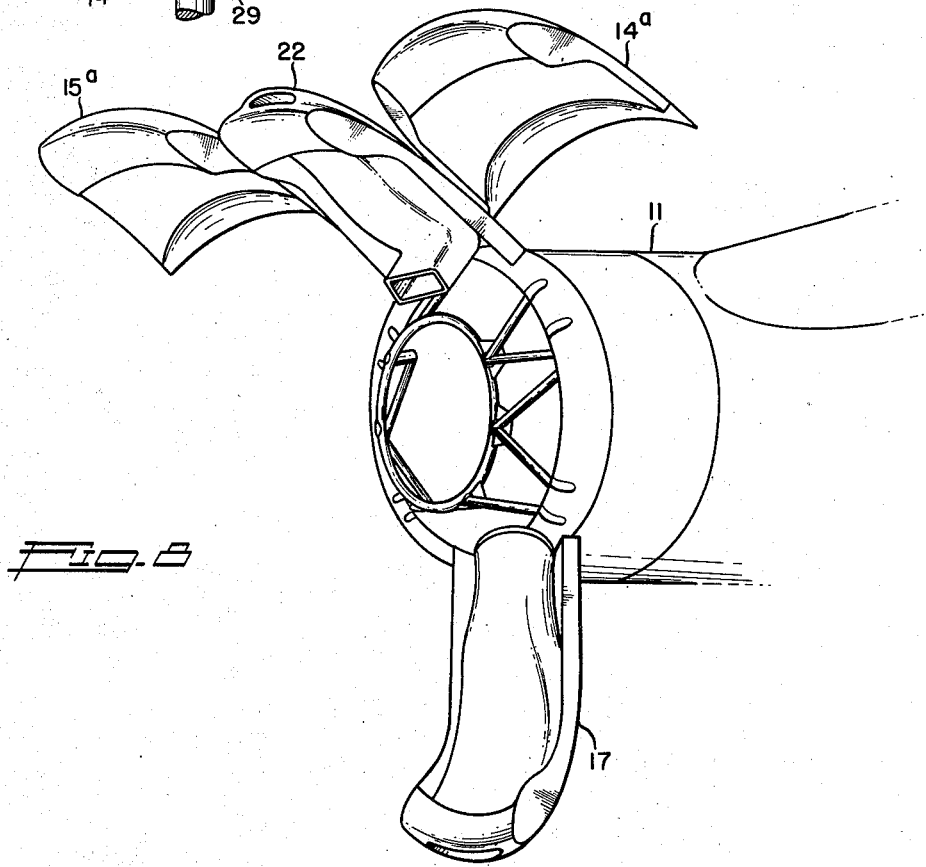
INVENTORS
JOHN C. DUFFENDACK JR.
WILLARD W. TJOSSEM
BY
Agent Patented Apr. 24, 1951

2,550,337

UNITED STATES PATENT OFFICE 2,550,337

ENGINE COWLING

John C. Duffendack, Jr., and Willard W. Tjossem, Burbank, Calif., assignors to Lockheed Aircraft Corporation, Burbank, Calif.

Application February 7, 1945, Serial No. 576,530

7 Claims. (Cl. 123—41.7)

This invention relates to improvements in aircraft engine cowling to promote access to the engine for checking and overhaul, the cowling of this invention being both hinged and readily removable to facilitate inspection and service of the engine and its accessories.

Because of the adoption of flexibly mounted power plants, which have a limited freedom of movement in all directions, it is no longer practical to use engine cowling supported from both the airplane or nacelle structure and from the power plant. Accordingly, it has become necessary to support the cowling, especially of radial type engines, as a cantilever structure entirely separate from the engine. It is therefore an object of our invention to provide improved accessibility and ready removability of the cowling panels or skin, and further, to separate and insulate the necessary air ducts supplying the carburetor, air heaters, supercharger, etc., from the cooling air flow around the engine, which cooling air is discharged through adjustable gills in the fixed part of the nacelle to the rear and independent of the engine access cowling.

It is a further object of this invention to provide an improved and simplified segmental cowling arrangement for aircraft power plants wherein the cowling segments are separately hinged and removable when opened and are latched to each other at their adjacent margins by multiple, simultaneously operable latches, converting the separate segments into a rigid whole independent of the engine enveloped thereby.

Other objects and features of the invention will be readily understood from the following detailed description of the typical preferred forms of the invention wherein reference will be made to the accompanying drawings in which:

Figure 1 is a perspective view of a power plant cowling embodying the features of this invention, the cowl segments being shown as opened up for access to the power plant;

Figure 2 is a front view with the cowling closed;

Figure 3 is an end section on the line 3—3 of Figure 1 showing the upper cowl hinge arrangement;

Figure 4 is a fragmentary section similar to Figure 3 showing one hinge in its cowling closed position;

Figure 5 is a fragmentary detail broken away to show the multiple latch operating mechanism for locking one upper cowl panel to the chin or scoop cowl panel;

Figure 6 is an enlarged section through one of the latches in its closed position; and Figure 7 is a perspective view corresponding to Figure 6 but in the latched released position.

Figure 8 is a perspective view of a modified form of cowling in its open position.

The embodiment chosen for illustration is intended for a multiple row radial engine, the outlines of which are shown in outline in Figure 1 as indicated by the reference numeral 10. The engine may be mounted in any convenient manner as by the usual cantilever mounting forward of a firewall (not shown) interiorly of an engine nacelle 11. With flexible or rubber mounts, the engine has a certain freedom of motion rotationally, axially and transversely. Accordingly, the cowling of this invention is also supported from the firewall so that it embraces or envelops the engine without structural contact therewith. Since a large volume of cooling air enters the cowling and flows over the engine, this air is discharged through gills 12 in the nacelle which are controlled by flaps 13.

The cowling of this invention is conveniently broken up into segments which as shown, comprise a pair of upper panels 14 and 15 oppositely hinged to a central top strong-back or cantilever beam 16 extending forwardly from the nacelle 11, and a bottom or chin panel 17 transversely hinged to open downward and backward away from the engine. The chin cowl is provided with an air scoop 18 feeding air, separate from the engine cooling air, into various ducts 19, 20, and 21, supplying engine accessories such as the carburetor, intercoolers and heat exchanger, as required by the particular installation. These ducts are shown as separating adjacent the parting or hinge line of the chin cowl when the latter is opened, and the joints in such ducts may carry suitable gasket or sealing material on their matching surfaces if desired.

If desired, the strong-back or cantilever beam 16 of Figures 1 to 4 may be enlarged to form a fourth panel 22 as shown in Figure 8. In either case the beam 16 or panel 22 may be removable, or hinged as shown in Figure 8 to increase the accessibility of the engine and facilitate hoisting or lowering the engine onto its mount. In the showing of Figure 8 the fourth panel 22 and the upper panels 14a and 15a hinge upwardly and outwardly respectively, the arrangement of hinges and latches being substantially that to be now described in connection with Figures 1 to 7 inclusive.

The upper panels 14 and 15 are each hinged to either side of the beam 16 as shown in Figures 3 and 4, the beam having a T-shaped top 23 which is formed with hook-like lips 24 to cooperate with complementary hook-like lips 25 on the upper panels 14 and 15. The latter are closed as shown in Figure 4. The hook-like lips 24 and 25 are provided to take some or most of the load off of hinges shown as two or more pins 26 carried by each of the upper panels and having portions of their diameter machined away to permit removal from open topped sockets 27 carried by the beam 16, when the panels are in the opened position of Figure 3. With this arrangement either or both of the upper panels 14 and 15 can be swung up and supported as shown in Figure 1 by suitable struts, or can be lifted away from the beam 16.

The chin panel 17 is supported by a pair of pin hinges 28 as shown in Figure 1, the pins being readily withdrawn when it is desired to remove the chin panel.

When the panels are to be closed into the position of Figure 2, the upper panels 14 and 15 are lowered into position and the chin panel 17 raised to engage a series of T-shaped pins 29, carried by the chin panel, in corresponding sockets 30 provided in the upper panels 14 and 15. The pins 29 are laterally pivoted and the sockets are formed to guide the pins into apertures 31 in rotatable latches 32 which are centrally cut away to receive the T heads 33 of the pins 29. The latches 32 are rotated from the position of Figure 7 to that of Figure 6 to both tighten and lock the panels together. Since it is desirable to operate the several latches 32 along one joint as a unit, Figure 5 shows an operating handle 34 for the simultaneous operation of the latches, which are interconnected by a link 35 and universally jointed shafts 36. The operating handle 34 is accessible through a door 37 shown in Figure 1, and is pulled out and down to release all the latches along the joint between one upper panel and the chin panel.

It will be noted from the foregoing that the complete cowling in its closed position is supported from the nacelle by the beam 16 and the chin panel hinges 28, while the separate panels are locked together in a unitary and rigid structure capable of carrying hoop tension loads, due to the lips 24 and 25 on the beam 16 and the latches 32 between the upper and chin panels.

While we have described our invention and the present preferred embodiments thereof, we desire to emphasize the fact that many modifications may be resorted to in a manner limited only by a just interpretation of the following claims.

We claim as our invention:

1. An annular cowling system for aircraft engines, the aircraft including an engine extending forwardly from a generally circular engine nacelle structure, comprising cantilever means independent of said engine and separately supported from said nacelle structure, including a plurality of cowl panels at least one of said panels being hinged directly to said nacelle structure, means supporting the remaining cowl panels on hinge axes normally parallel to the center line of the nacelle structure, and means for latching said last mentioned cowl panels to said first mentioned panel whereby to produce a rigid cantilever self-sustaining cowling system capable of resisting distortion.

2. An annular cowling system for enclosing a radial air-cooled aircraft engine, the aircraft including nacelle structure for separately supporting the engine and cowling system on the aircraft side thereof, comprising a plurality of cowl panel segments at least two of which are hinged to the nacelle structure on lines transversely of the axis of said cowling and means for latching the cowl panel segments together in a rigid cantilever whole.

3. An annular cowling system for enclosing a radial air-cooled aircraft engine, the aircraft including nacelle structure for separately supporting the engine and cowling system at the aircraft side thereof, comprising a plurality of cowl panel segments at least two of which are hinged to the nacelle structure on lines transversely of the axis of said cowling, means for latching the cowl panel segments together in a rigid annular whole, and means for simultaneously actuating a plurality of latches along the joint between adjacent cowl panel segments hinged parallel to and transversely of the axis of the cowling.

4. In a cowl system a plurality of segmental cowl panels adapted in their closed position to form an annulus enclosing an aircraft engine, means hingedly supporting at least one of said panels on hinge axes transverse to the axis of the cowl annulus, said panel having air ducts mating adjacent the hinge axis means hingedly supporting others of said panels on hinge axes parallel to the axis of the cowl annulus, and means adapted to latch said cowl panels to each other to form a rigid and self-supporting annulus independent of said aircraft engine.

5. In a cowl system a plurality of segmental cowl panels adapted in their closed position to form an annulus enclosing an aircraft engine, means hingedly supporting top and bottom cowl panels on hinge axes transverse to the axis of the cowl annulus, means hingedly supporting side panels on hinge axes associated with the top panel parallel to the axis of the cowl annulus, and means providing a plurality of simultaneously actuable latches adapted to latch said side cowl panels to the bottom panel to form a rigid and self-supporting annulus independent of said aircraft engine.

6. In a cowl system a plurality of segmental cowl panels adapted in their closed position to form an annulus enclosing an aircraft engine, means hingedly and detachably supporting at least one of said panels on hinge axes transverse to the axis of the cowl annulus, means hingedly and detachably supporting others of said panels on hinge axes parallel to the axis of the cowl annulus, and means adapted to latch said cowl panels to each other to form a rigid and self-supporting annulus independent of said aircraft engine.

7. A cowling system for an aircraft power plant comprising a nacelle structure having means to support said power plant, a series of cowl segments, means hingedly supporting two of said cowl segments from said nacelle structure, means hingedly supporting other of said cowl segments from one of the first mentioned cowl segments, the hinge axes of said second mentioned cowl panels being longitudinal relative to the axis of the cowling system, and means for latching the several cowl panels into a unitary and rigid annulus.

JOHN C. DUFFENDACK, Jr.
WILLARD W. TJOSSEM.

REFERENCES CITED

The following references are of record in the file of this patent:

UNITED STATES PATENTS

| Number | Name | Date |
|---|---|---|
| 2,178,998 | Scott | Nov. 7, 1939 |
| 2,319,843 | Berlin et al. | May 25, 1943 |
| 2,421,689 | Elkin | June 3, 1947 |